Figure 1:
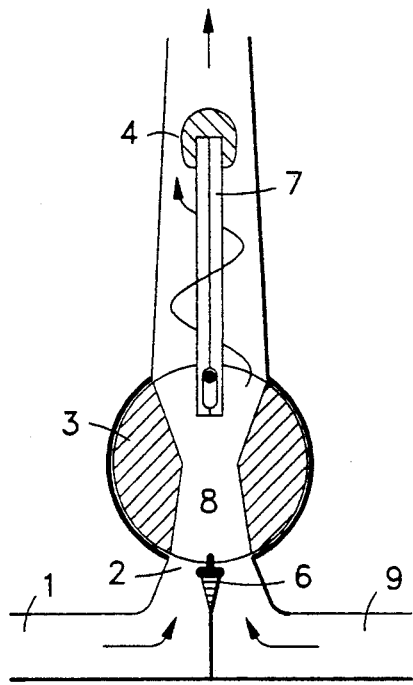

United States Patent [19]

Stewart

[11] Patent Number: 5,108,032

[45] Date of Patent: Apr. 28, 1992

[54] FLUID MIXTURE CONTROL VALVE

[76] Inventor: John V. Stewart, 1308 Henry Balch Dr., Orlando, Fla. 32810

[21] Appl. No.: 338,099

[22] Filed: Apr. 14, 1989

Related U.S. Application Data

[62] Division of Ser. No. 233,578, Aug. 18, 1988, Pat. No. 4,877,181.

[51] Int. Cl.$^5$ ............................................. G05D 23/13
[52] U.S. Cl. .............................. 236/12.17; 137/625.41; 137/625.47; 366/340
[58] Field of Search ....................... 236/12.16, 12.17; 137/625.41, 625.47, 637; 251/48; 366/340

[56] References Cited

U.S. PATENT DOCUMENTS

| | | | |
|---|---|---|---|
| 59,939 | 11/1866 | Allan | 137/625.41 |
| 164,448 | 6/1875 | Hallett | 137/625.41 |
| 232,894 | 10/1880 | Koetzner | 137/625.41 |
| 697,739 | 4/1902 | Murreta | 137/625.41 X |
| 1,230,978 | 6/1917 | Anderson | 137/625.41 X |
| 1,614,437 | 1/1927 | Cochran | 137/625.41 |
| 1,787,304 | 12/1930 | Becker | 236/12.17 |
| 2,017,194 | 10/1935 | Zimmerman | 236/12.17 |
| 2,069,040 | 1/1937 | Lodder | 236/12.17 |
| 2,146,929 | 2/1939 | Bassett, Jr. | 236/12.17 |
| 2,494,044 | 1/1950 | Jurisich et al. | 236/12.17 |
| 2,546,423 | 3/1951 | Bentsen | 236/12.17 |
| 3,156,260 | 11/1964 | Harvey et al. | 137/625.41 |
| 3,701,364 | 10/1972 | Have | 137/625.41 |
| 3,934,796 | 1/1976 | Smith, Jr. et al. | 251/48 X |
| 4,349,149 | 9/1982 | Humpert | 236/12.16 |

FOREIGN PATENT DOCUMENTS

| | | | |
|---|---|---|---|
| 2802377 | 7/1979 | Fed. Rep. of Germany | 236/12.17 |
| 3019924 | 12/1981 | Fed. Rep. of Germany | 137/625.41 |
| 1204241 | 1/1986 | U.S.S.R. | 366/340 |

Primary Examiner—William E. Tapoical

[57] ABSTRACT

A fluid mixing valve designed for hot/cold water mixing in showers provides fully adjustable proportioning independent of flow rate. It may be thermostat controlled for convenience, and to save water by avoiding iterative manual adjustment. It comprises a rotor enclosed in a fitted case, the case having adjacent fluid inlets and an elongated outlet. The rotor has a throat, one end of which registers with the inlets in varying proportion depending on the position of the rotor. A linkage arm within the elongated outlet connects between the rotor and a control shaft. This arm transmits control movements from shaft to rotor, and is also the thermostatic element. Hydrodynamic forces are neutral against the rotational moment of the rotor, avoiding rotor oscillation. Damping means are described. Mixing occurs immediately in the throat, and is completed prior to the thermostat. This valve is expected to be used with a downstream flow valve.

13 Claims, 1 Drawing Sheet

FLUID MIXTURE CONTROL VALVE

This is a division of application Ser. No. 07/233,578, now U.S. Pat. No. 4877181, filed Aug. 18, 1988.

BACKGROUND

1. Field of Invention

This invention relates to valves for adjustable mixing of fluids, especially thermal mixing of water for baths and showers.

2. Prior Art

There are many types of water mixing valves for baths and showers, but each has disadvantages.

The most common arrangement incorporates separate flow valves for hot and cold water, combining the flow path downstream. The user must adjust both valves iteratively to arrive at a desired combination of temperature and flow rate. This is inconvenient and time consuming. The iterative process must be repeated for each change of temperature or flow, discouraging a change of flow rate during showers to save water.

Another type of mixing valve, commonly found in kitchen sinks, has a single lever which controls both mixture and flow. These valves are adjusted iteratively, since there are no reference points for the control. Trial and error must be used to find a desired position in the spherical range of the control handle. The exact full hot position is not certain, so cold water may be wasted while waiting for hot water to arrive. These valves are notorious leakers, probably due to the complex stressing of seals from the three-dimensional motion of the handle.

A shower valve often found in hotels has a single control handle for the hot/cold mixing ratio, which also turns the flow fully on or off. Adjustment is simplified by the lack of graduated flow control. Iterative temperature adjustment is still required, although it is made easier. The tradeoff is waste due to excessive flow. People do not choose such valves for their homes, preferring the ability to adjust the flow low to economize, and high for rinsing and scalp massage.

Time and water is wasted during the adjustment period of shower valves that require iterative adjustment. The total waste is substantial, since this activity is performed every day by many people. As a ballpark figure, assume 100,000,000 baths or showers a day are taken in the U.S., with the following three roughly estimated categories of waste. This invention offers partial savings in the second and third categories, although its main claimed benefit is user convenience.

|     | WASTED SECONDS | WASTED GALLONS | DESCRIPTION |
| --- | --- | --- | --- |
| (a) | 20 | 1 | Water in transit from heater to valve |
| (b) | 20 | 1 | Iterative temperature and flow adjustment |
| (c) | 0  | 1 | Water running while soaping only |
| TOTAL DAILY WASTE IN U.S. | | | 1,000,000 man-hours |
| | | | 300,000,000 gallons |
| TOTAL YEARLY WASTE IN U.S. | | | 365,000,000 man-hours |
| | | | 100,000,000,000 gallons |

An auxiliary flow valve can be installed downstream of the water mixing point to provide independent control of the total flow rate. Such a valve is available in some shower heads for temporary shutoff, saving in category C. However, the water is cooler when restarted, due to heat loss while the flow is stopped. Shower heads are generally not adequately leakproof to provide a primary shutoff, so the mixture valves are used, and must be readjusted for each shower.

Such an auxiliary valve can be fully leakproof, and the mixture controls left at their last setting between showers. However, cold water then runs during startup, wasting both water and time.

Another approach is to heat water at its point of use. This is effective and efficient in terms of time, water, and heating energy. However, it is expensive to install a water heater at each point of use, and it requires the skills of both an electrician and plummer. It also adds complexity and priority to maintenance and repair. Improper or damaged installation presents electric shock hazard at its most dangerous site.

Several thermostatic mixing valve designs are recorded in patents, but they are not commonly used in showers, to the applicant's knowledge, possibly due to disadvantages such as those mentioned here for one such valve—inventor Baberg, W. German patent 2802377, 7/1979.

The design of Baberg's mixing valve causes an inherent mixing delay due to the separation of the inlet ports by the valve rotor. The separation of inlet flows persists due to baffling by the rotor and thermostat connection parts, which prevents thorough mixing prior to the thermostat element. Thus, uneven mixing may complicate calibration of the thermostat due to thermal eddies. Eddies are unpredictable due to variability in inlet pressures, baffle variation with valve position, and sample variation in manufactured valves. The present invention mixes immediately in the throat of the mixing valve, and provides thorough mixing prior to the thermostat.

Another disadvantage in Baberg's valve is that hydrodynamic pressure is not neutral against the rotor. Inlet flow impinges on the rotor and thermostat connection parts, causing rotational moment on the rotor. This is detrimental to calibration. The opening of an inlet causes dynamic pressure on the rotor which tends to re-close the inlet. This in turn reduces flow, allowing the inlet to reopen, and so on. This is likely to result in oscillations of the rotor, requiring damping. The present invention is designed with neutral rotational effect on the rotor from the inlet flows.

OBJECTS AND ADVANTAGES

The object of this invention is to meet the following criteria for the most desirable mixing valve for use in showers:

1. Provide a full range of graduated temperature control that is independent of flow rate.
2. Allow temperature to be preset, so that iterative adjustment is not needed.
3. Require only normal plumbing skills for installation and maintenance. Use no electricity.

As will be seen from the description, all of these criteria are met in a practical way in the present invention.

DRAWING FIGURES

Figure 2:
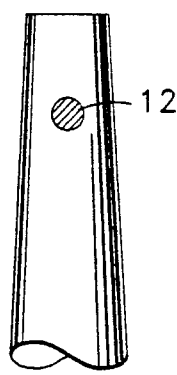
Figure 3:
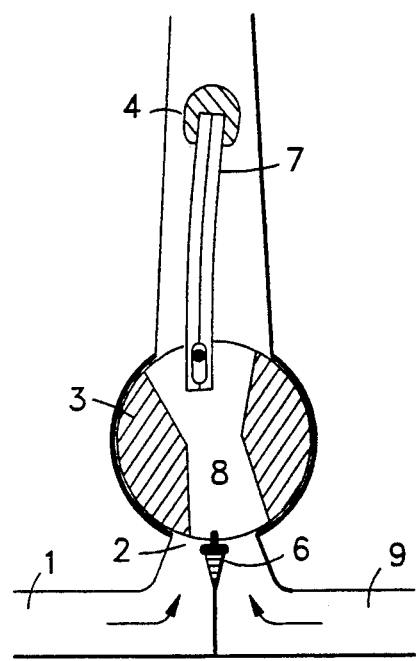
Figure 4:
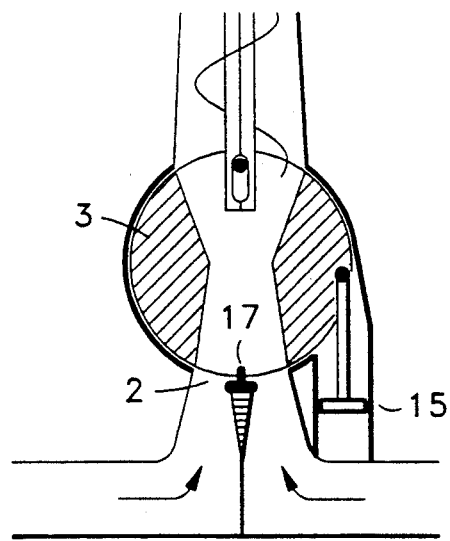
Figure 5:
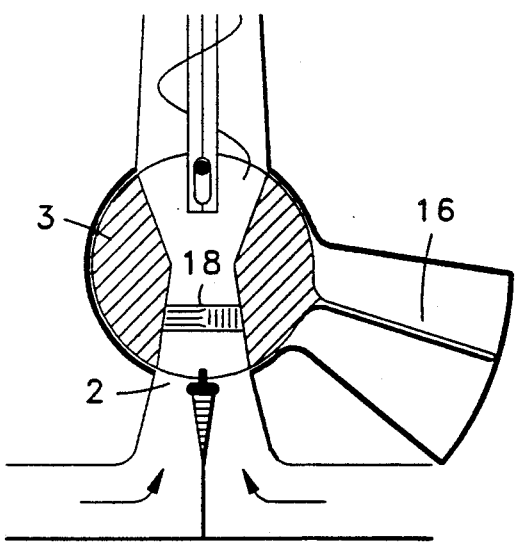

FIG. 1—Frontal section view
FIG. 2—Elevation view of upper part of case, showing external control shaft
FIG. 3—Illustrates the changes in internal element positions compared to FIG. 1 after control shaft rotation to reduce temperature
FIG. 4—Mixing valve with piston damper
FIG. 5—Mixing valve paddle damper

DRAWING REFERENCE NUMERALS

1—Hot inlet flow path
2—Inlet aperture
3—Rotatable element, or rotor
4—Rotatable anchor of thermostat element
6—Separator baffle
7—Bi-metallic thermostat element
8—Throat
9—Cold inlet flow path
12—Control shaft
15—Piston damper
16—Paddle damper
17—Valve stop
18—Mixing foil

DESCRIPTION

FIG. 1 shows hot and cold flows entering inlet ports 2 in a mixing valve. Rotor 3 is in its centered position, admitting the inlet flows in equal proportions. It rotates in the plane of the section. Anchor 4 rotates thermostat element 7, thence rotor 3, thus controlling the mixture setting. Anchor 4 is rotated via control shaft 12 of FIG. 2. The thermostat element is used as a linkage arm. By virtue of its bi-metallic structure, it deforms predictably under temperature change, affecting the mixing valve to compensate for departures from the selected temperature.

A simplified embodiment may omit the thermostat element, using a simple linkage arm from anchor 4 to rotor 3.

The rotation resistance of the valve rotor must be light by comparison to that of anchor 4. Anchor rotation resistance includes the friction of shaft 12 against its seal. Additional friction can be provided, if needed, by an external control arm (not shown) connected to shaft 12, via light contact of the arm against a dial as described in the parent invention. The valve rotor should rotate nearly friction free for responsiveness to the thermostat and linkage arm 7. Tightness is not required in this valve, although reasonably close tolerances are desirable. Hydrodynamic forces should be essentially neutral against the rotation moment of the rotor in all its positions. In the embodiment shown, inlet pressure is directed toward the axis of rotation of rotor 3, and exerts no rotational moment. The valve should be tested for oscillation in a variety of conditions, and redesigned or damped if necessary.

Appropriate damping means include increasing the rotation inertia of rotor 3, via its size, shape, or material, or the use of a paddle or piston for water-viscosity damping. If a piston is used, it can fit loosely in its cylinder and have no valves or rings, allowing water to squeeze past it in both directions of travel. These means can be implemented without substantially increasing rotation resistance at slow rotation speeds.

Baffles or foils can be used to insure mixing of hot and cold water prior to thermostat element 7. An appropriate location for such foils is in the throat 8 of the mixing valve. These must not exert rotational moment upon element 3 about its axis of rotation. A suggested means is a blade foil crossing the throat from cold to hot side. A partial twist at the foil's center provides symmetrically opposed foils on opposite sides of the throat to induce water rotation. For example, a twist of 60 degrees provides effectively two foils of 30 degree deflection. The moment of rotation thus exerted upon rotor 3 is perpendicular to its plane of rotation, which is not detrimental.

The bi-metallic element is illustrated in the form of a straight, thick embodiment for clarity. However, it may be longer, thinner, coiled, and so forth. FIG. 1 shows this element in neutral stress, which is expected to be designed for a nominal medium temperature, such as 95° F. (35° C.). At other temperatures the element deforms and modifies the mixture valve setting. The magnitude of this modification should be such that when the temperature setting is medium, and the water is cold, the mixture valve is modified to full hot. This brings hot water rapidly to the valve during the start-up period. A nominal "cold" water temperature can be considered 80° F. (26.7° C.), or less, since this is substantially below the average desired bath temperature.

In general, the thinner the bi-metallic element, the more responsive the thermostat, but the less forceful. This is a design tradeoff. However, forcefulness can be increased without reducing responsiveness by increasing the bi-metallic blade width.

The thermostat will try to prevent all temperature deviations, including intentional adjustments. This must be taken into account in the range of motion of anchor 4. As shown in FIG. 3, anchor 4 must rotate farther to achieve a given adjustment in the thermostat embodiment than if a simple linkage arm is used.

The mixing valve throat should unblock a total inlet area which is greater, under all conditions, than some later restriction point in the device. This assures that the total flow rate is independent of mixture setting. Each inlet aperture must individually meet this same criterion, since one apertures may be completely blocked. A downstream flow control valve (not shown) is expected to be used with this mixing valve, and will be the most restrictive aperture at least some conditions. If it is not so when fully open, then another restriction point subsequent to the mixing valve must apply.

Cross flow between the cold and hot water inlet pipes of this device should be prevented when it is not in use. This could occur when open valves elsewhere on either line cause a pressure differential between the hot and cold sides. The mixing valve should normally block the cold side when the thermostat cools between uses, as mentioned previously regarding the magnitude of thermostat modification. The seal between rotor 3 and baffle 6, which separates the hot and cold inlet apertues, should be adequate for this purpose. A reasonable seal can be achieved via close radial tolerance between rotor 3 and baffle 6. However, radial contact should be avoided to prevent a sticking valve. The seal is improved if the baffle extends radially inward and serves as a stop for valve rotation in each direction. This stop, shown as item 17 in FIG. 4, provides a line of direct contact against the valve throat edge. A perfect seal is not necessary, but cross flow should be restricted to an insignificant amount so that hot water is not wastefully pulled into the lines by the use of a cold water valve elsewhere. Another means for cross-flow prevention is a check valve on each inlet pipe, allowing flow only toward the mixing valve.

PREFERRED EMBODIMENT

The preferred embodiment is essentially as illustrated in FIGS. 1-3, with the following differences:

The bi-metallic element is thin, for fast response, and wide for strength. It may be coiled.

Mixing foils, as described.

For environments with hot and cold water pressures that are often substantially unequal, embodiments with check valves should be available.

A low-priced version should be available which has no thermostat element, using a simple lever arm instead.

OPERATION

In a thermostat embodiment, the valve is adjusted via control shaft 12 to a medium setting, or to a setting established by previous use. Flow rate is then set by a downstream flow valve. Temperature adjustment is unnecessary once a setting is established from previous use.

In a non-thermostat embodiment, the temperature control may be rotated to full hot at first, to speed warm-up, then adjusted or placed on a previously established setting.

I claim:

1. A valve for mixing fluids in controllable proportion comprising:
   a rotatable element in a fitted case;
   said case having two adjacent fluid inlets and a fluid outlet;
   said rotatable element having a throat therethrough, one end of which registers with the inlets in controllable proportion depending on the position of said rotatable element, and the second end of which is always in approximate register with said outlet, and
   means in said outlet for controlling the rotational position of said rotor.

2. The apparatus of claim 1 wherein said one end of said throat has leading and trailing edges, and further including a stop, protruding into said throat from between said two inlets, and having sides which match in shape said edges.

3. The apparatus of claim 1, further including foil means within said throat for inducing rapid mixing of fluid entering the throat from said inlets.

4. The apparatus of claim 3 wherein said foil means comprises a blade crossing said throat and containing a partial twist near the center of said blade.

5. The apparatus of claim 1 further including a piston damper comprising a cylinder integral with said case, a piston loosely fitted within said cylinder, and a piston rod, one end of which is connected eccentrically to said rotatable element, and the second end is connected to said piston.

6. The apparatus of claim 1 further including a paddle damper, comprising a hollow extension of said case, adjacent the circumference of said rotatable element, a paddle connected to said element and extending radially from said element into said extension.

7. An apparatus for mixing two fluids of different temperatures, and controlling the resultant temperature, comprising:
   a rotatable element in a fitted case;
   said case having two adjacent fluid inlets and an elongated fluid outlet;
   said rotatable element having a throat therethrough, and rotatable to position one end of the throat in register with both of said inlets, or to block said inlets in variable proportion, the second end of the throat in approximate register with said outlet;
   a control shaft; and
   a linkage arm contained in said elongated outlet, one end of said linkage arm connected to said rotatable element, and the other end connected to said control shaft.

8. The apparatus of claim 7 wherein said one end of said throat has leading and trailing edges, and further including a stop, protruding into said throat from between said two inlets, and having sides which match in shape said edges.

9. The aparatus of claim 7, further including foil means within said throat for inducing rapid mixing of fluid entering the throat from said inlets.

10. The apparatus of claim 9 wherein said foil means comprises a blade crossing said throat and containing a partial twist near the center of said blade.

11. The apparatus of claim 7 wherein said linkage arm is constructed of a plurality of materials with different expansion coefficients.

12. The apparatus of claim 7 further including a piston damper comprising a cylinder integral with said case, a piston loosely fitted within said cylinder, and a piston rod, one end of which is connected eccentrically to said rotatable element, and the second end is connected to said piston.

13. The apparatus of claim 7 further including a paddle damper, comprising a hollow extension of said case, adjacent the circumference of said rotatable element, a paddle connected to said element and extending radially from said element into said extension.

* * * * *